(12) United States Patent
Drutman et al.

(10) Patent No.: US 6,618,593 B1
(45) Date of Patent: Sep. 9, 2003

(54) LOCATION DEPENDENT USER MATCHING SYSTEM

(75) Inventors: Charles Drutman, Lynnfield, MA (US); Darlene Drutman, Lynnfield, MA (US); Andrew Egendorf, Lincoln, MA (US); Norton Greenfeld, Wayland, MA (US); Eugene Pettinelli, Sudbury, MA (US)

(73) Assignee: RovingRadar, Inc., Wayland, MA (US)

( * ) Notice: Subject to any disclaimer, the term of this patent is extended or adjusted under 35 U.S.C. 154(b) by 0 days.

(21) Appl. No.: 09/658,671

(22) Filed: Sep. 8, 2000

(51) Int. Cl.$^7$ ................................................ H04M 3/42
(52) U.S. Cl. ...................... 455/456; 455/414; 455/266; 342/357.11
(58) Field of Search ................................. 455/456, 414, 455/415, 457, 566, 418; 342/357.11

(56) References Cited

U.S. PATENT DOCUMENTS

| | | | |
|---|---|---|---|
| 5,493,692 A | 2/1996 | Theimer et al. | ........... 455/26.1 |
| 5,754,939 A | 5/1998 | Herz et al. | ................... 455/4.2 |
| 6,014,090 A | 1/2000 | Rosen et al. | ................. 340/905 |
| 6,049,711 A | * 4/2000 | Ben-Yehezkel et al. | ..... 455/414 |
| 6,349,203 B1 | * 2/2002 | Asaoka et al. | .............. 455/414 |

OTHER PUBLICATIONS

International Search Report for PCT/US01/28121.

* cited by examiner

Primary Examiner—Edward F. Urban
Assistant Examiner—Sheila Smith
(74) Attorney, Agent, or Firm—Ira J. Schaefer, Esq.; Clifford Chance US LLP

(57) ABSTRACT

A system and method for matching first and second mobile communications devices are provided. Preference or profile information associated with the first and second mobile communications devices is transmitted to a central server for matching the first and second devices. Location information and transmission statuses of the first and second mobile communications device are also transmitted to the central server. Data related to the location of either device is transmitted to the other device depending upon the matched statuses of the mobile communications devices and the location and transmission status information associated with the mobile communications devices.

22 Claims, 5 Drawing Sheets

LOCATION DEPENDENT USER MATCHING SYSTEM

FIELD OF THE INVENTION

The present invention relates generally to telecommunications. More particularly, the present invention relates to an apparatus and method for identifying mobile telecommunications users and transmitting location-based data to them based upon preferences or matching requirements specified by the users.

BACKGROUND

Mobile telecommunications users often desire information related to their geographic location. In numerous applications, such as convenience shopping and determining an optimal automobile travel route, data related to the geographic location of the user is provided to the user. For example, the Vindigo system is an Internet-based "find-it" service in which a user of a Palm personal data assistant ("PDA") having wireless connectivity to the Internet can request the location of the nearest restaurant or movie theater. The database of subscribing service locations, stored on a computer server connected to the Internet or World Wide Web, is queried when the request is received. Matching information, including location information, regarding the requested service based on the location of the PDA is transmitted to the Palm PDA device over the wireless network connection. This system has a drawback, however, in that the user must specify the location of the requesting PDA because its location is not automatically "tracked" by a position determining system like the Global Positioning System (GPS).

As another example, the OnStar automobile navigation system uses cellular phone technology and automatic GPS tracking to send information to the automobile or to services organizations that support the automobile. In particular, driving directions may be provided to a stranded motorist based on his GPS-determined location and a desired destination. Also, remote services, such as contacting the nearest emergency services in the event of an airbag deployment or remotely unlocking the automobile in the event the keys are locked within the car, are also provided based on the GPS-determined location of the automobile. This system is limited, however, in that two such automobiles equipped with the OnStar system can not request information related to the position of each other.

Other systems and methods for delivering local information to mobile travelers, such as those disclosed in U.S. Pat. No. 6,014,090, permit a data profile or specific set of preferred facilities to be specified by a mobile communications device user. The mobile communications devices disclosed in this patent contain a GPS transmitter. As the user's telecommunications device moves from location to location, a central resource server provides data to the mobile user through the mobile communications device corresponding to the user's selected preferences, for example a list of desired hotels, restaurants, or gas stations. Like the OnStar system, no provision is made for the simultaneous tracking and notification of a plurality of mobile users based on the positions of the other users.

Thus, it is desirable for a telecommunications system to notify a first mobile communications user of a second mobile communications user, including providing information related to the location of the second mobile communications device. Such user notification may be based on a physical proximity to one another and/or notification preferences specified by the users. Further, it is often desirable to permit an "availability" status to other mobile communications users to further qualify the transmission of the information related to a user's location to other users, even when physical proximity and notification preference requirements are met.

SUMMARY OF THE INVENTION

According to one aspect of the present invention, a system for matching users of mobile communications devices is provided comprising a first mobile communications device for transmitting information defining a location of the first mobile communications device and a user receiving status; a second mobile communications device for transmitting information defining a location of the second mobile communications device and a user receiving status; and a central unit having a processor coupled to a memory, the central unit capable of communicating with the first mobile communications device over a first wireless communications link and with the second mobile communications device over a second wireless communications link, the memory storing a first user profile including information associated with a user of the first mobile communications device and a second user profile including information associated with a user of the second mobile communications device, wherein the central unit receives the user receiving statuses and the information defining the locations of the first and the second mobile communications devices and wherein the processor receives the first and the second user profiles to match information of the users and, if there is a match and depending upon the user receiving statuses, effects the transmission to the first mobile communications device of locating information for the second mobile communications device and effects the transmission to the second mobile communications device of locating information for the first mobile communications device, the locating information for each of the devices being based upon the information defining the locations of the first and the second mobile communications devices.

In the above invention, it is also desirable to provide a system in which the first user profile and the second user profile each of which includes a location, area, or volume and the match of information of the users includes a match of the location, area, or volume contained in the first user profile with the location of the second mobile communications device and a match of the location, area, or volume contained in the second user profile with the location of the first mobile communications device in the invention above.

In another aspect of the invention, it is desirable to provide a system for matching users of mobile communications devices comprising a first mobile communications device for transmitting information defining a location of the first mobile communications device and a user receiving status; a second mobile communications device for transmitting information defining a location of the second mobile communications device; and a central unit having a processor coupled to a memory, the central unit capable of communicating with the first mobile communications device over a first wireless communications link and with the second mobile communications device over a second wireless communications link, the memory storing a first user profile including information associated with a user of the first mobile communications device and a second user profile including information associated with a user of the second mobile communications device, wherein the central unit receives the user receiving status from the first mobile communications device and the information defining the locations of the first and the second mobile communications devices and wherein the processor receives the first and the second user profiles to match information of the users and, if there is a match and depending upon the user receiving status, effects the transmission to the first mobile communications device of locating information based upon the information defining the locations of the first and the second mobile communications devices.

In the above invention, it is also desirable to provide a system in which the first user profile includes a location, area, or volume and the match of information of the users includes a match of the location, area, or volume with the location of the second mobile communications device. Further, the system may include features in which the user receiving status is provided by a power-on state of the first mobile telecommunications device.

In yet another aspect, the present invention includes a system for matching users of mobile communications devices comprising a first mobile communications device for transmitting information defining a location of the first mobile communications device; a second mobile communications device for transmitting information defining a location of the second mobile communications device and a user sending status; and a central unit having a processor coupled to a memory, the central unit capable of communicating with the first mobile communications device over a first wireless communications link and with the second mobile communications device over a second wireless communications link, the memory storing a first user profile including information associated with a user of the first mobile communications device and a second user profile including information associated with a user of the second mobile communications device, wherein the central unit receives the user sending status from the second mobile communications device and the information defining the locations of the first and the second mobile communications devices and wherein the processor receives the first and the second user profiles to match information of the users and, if there is a match and depending upon the user sending status, effects the transmission to the first mobile communications device of locating information based upon the information defining the locations of the first and the second mobile communications devices.

In the above invention, it is also desirable to provide a system in which the first user profile includes a location, area, or volume and the match of information of the users includes a match of the location, area, or volume with the location of the second mobile communications device. It is also desirable to provide a system in which the user sending status is provided by a power on state of the second mobile telecommunications device or in which the locating information is locating information for the second mobile communications device. Systems are further contemplated in which the locating information includes a location other than the location of either the first mobile communications device or the second mobile communications device or in which at least one of the first and the second mobile communications devices includes an input device for inputting the profile information.

In the above invention, it is also desirable to provide a system in which the user profile information includes characteristics of the user and preferences of the user, and the match of information of the users includes matching preferences of the first user with characteristics of the second user and preferences of the second user with characteristics of the first user. It is also desirable to provide a system in which at least one user and the preferences of at least one user is selected from the group consisting of a business relationship, a social relationship, a family relationship, physical characteristics, food, clothing, sports, entertainment, music, and video or in which at least one of the first and the second mobile communications devices is a cellular phone, a pager, a personal data assistant, a global positioning system receiver, a transponder, a radio, a walkie-talkie, or a wireless Internet access device. Further it is desirable to provide systems in which the information defining the location of at least one of the first and the second mobile communications devices includes an address, an intersection, a landmark, a marker, co-ordinates, or a telephone number or in which the locating information includes a map, vectors, directions, and an address.

In the above invention, it is also desirable to provide a system in which the locating information includes audio information, video information, textual information, or graphical information or in which the locating information is updated to track a movement of at least one of the first and the second mobile communications devices or in which the central unit transmits additional information to at least one of the first and second mobile communications devices with the locating information. It is also desirable to provide a system in which additional information is obtained from an Internet web site or in which the user profile of at least one of the first mobile communications device and the second mobile communications device includes information identifying the user of the other mobile communications device.

In yet another aspect, the present invention includes a system for notifying a first user and a second user of mobile communications devices of each other's presence comprising a first mobile communications device for the first user, the first mobile communications device transmitting a location of the first user and a first user receiving status; a second mobile communications device for the second user, the second mobile communications device transmitting a location of the second user and a second user receiving status; and a central unit having a processor coupled to a memory, the central unit capable of communicating with the first mobile communications device over a first wireless communications link and with the second mobile communications device over a second wireless communications link, the memory storing a profile for each of the first user and the second user, wherein the central unit matches the first user and the second user if the first user profile contains a preference for the second user and the second user profile contains a preference for the first user and the location of the first user and the location of the second user are within a specified distance of one another, the central unit transmitting the location of the first user to the second user and the location of the second user to the first user upon making the match and depending upon the first and second user receiving statuses.

In a final aspect, the present invention includes a child location system for notifying a parent comprising a mobile communications device for a parent; a mobile communications device for a child, the mobile communications device for the child capable of transmitting a location of the child and a status indicator for the mobile communications device of the child; and a central unit coupled to a memory, the central unit coupled to the mobile communications device for the parent over a first mobile communications link and coupled to the mobile communications device for the child over a second mobile communications link, the memory storing a parent profile including information identifying the mobile communications device of the child and a child profile including information identifying the mobile communications device of the parent, the central unit receiving the status indicator and the location of the child from the second mobile communications device and making a match between the mobile communications device of the parent and the mobile communications device of the child based on the parent profile and the child profile, the central unit transmitting information related to the location of the child to the mobile communications device of the parent over the first mobile communications link upon making said match when the location of the child is outside a predefined boundary.

DETAILED DESCRIPTION OF THE INVENTION

Figure 1:
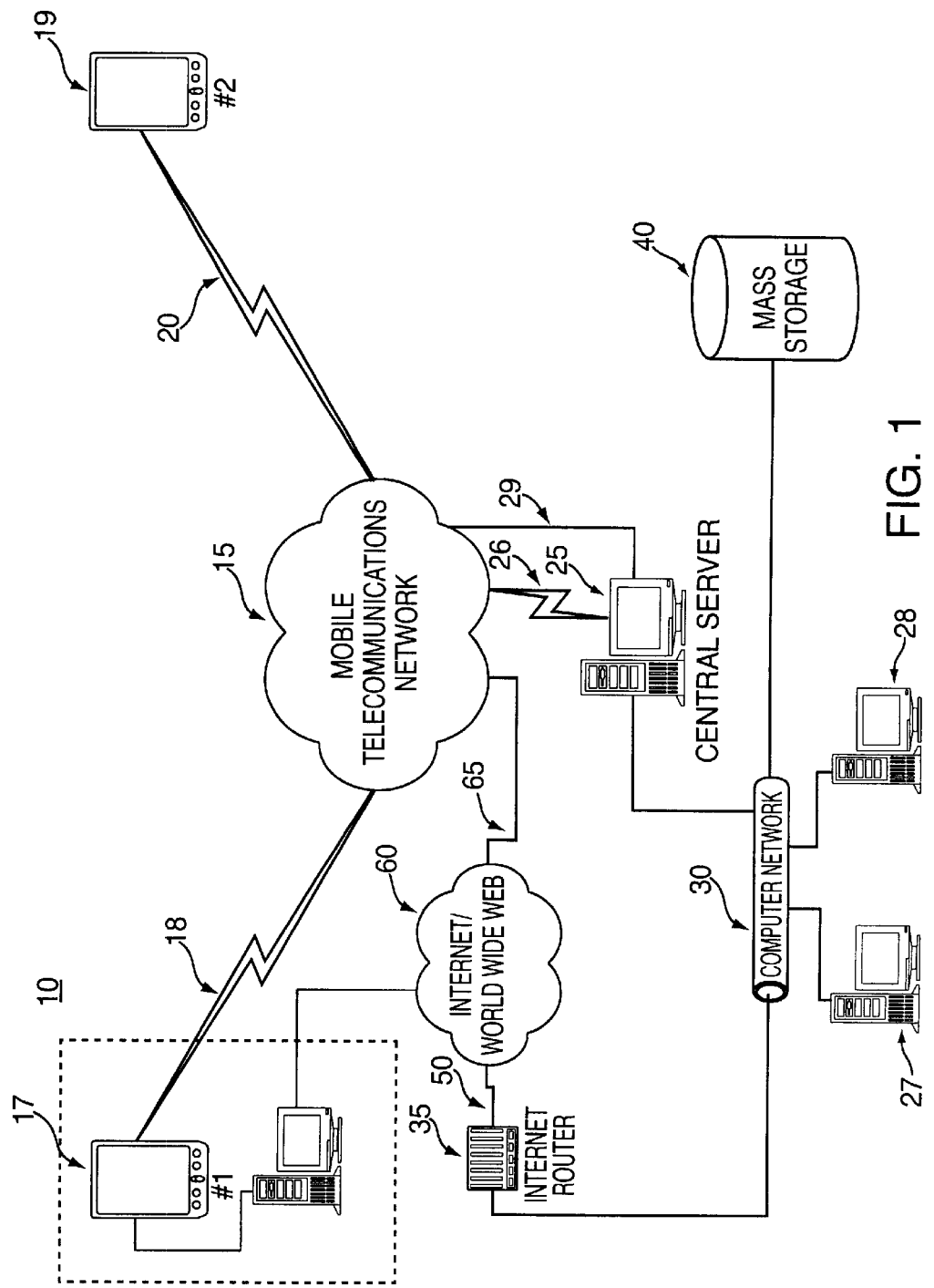
FIG. 1 is a diagram of a mobile telecommunications network according to one embodiment of the present invention.

Referring to FIG. 1, a mobile telecommunications system 10 according to a particular embodiment of the present invention is shown. Mobile telecommunications system 10 consists of a mobile telecommunications network 15 that connects a first mobile communications device 17 with a second mobile communications device 19 over first and second wireless communications links 18 and 20 respectively. Mobile telecommunications network 15 may consist of a cellular telephone network using one of the cellular telecommunications protocols, such as Code Division Multiple Access (CDMA), Global System for Mobile Communications (GSM) or Time Division Multiple Access (TDMA). Further, mobile telecommunications network 15 may be a pager network, a wireless web network employing, for example, any of the wireless protocols such as WAP, i-mode or 3G, or any other such wireless data or voice transmission network. Likewise, first and second mobile communications devices 17 and 19 may be cellular telephones, pagers, PDAs or other mobile communications or computing devices compatible with mobile telecommunications network 15. Further, the mobile communications devices may be associated with a user, e.g., a human being, pet, livestock, or a particular physical entity, e.g., an automobile, a house, a retail shop, or heavy equipment.

Mobile telecommunications network 15 is connected to a central computer server 25. Central server 25 minimally includes a processor with associated memory. Central server 25 may be a personal computer, Internet or World Wide Web (hereinafter used interchangeably) server, mainframe computer, or other computing device capable of connecting to mobile telecommunications network 15. Central server 25 may be connected to mobile telecommunications network 15 via wireless link 26. Central server 25 is also connected to computer network 30 which, in turn, is connected to other computers 27 and 28. Computer network 30 is further connected to mass storage devices 40 for storing large amounts of data related to the mobile communications devices 17 and 19 and their respective users. It should be understood that mass storage devices 40, as well as all other computer memories resident on computer network 30, are accessible by central server 25 and are considered to be "associated" memory for the purpose of storing and retrieving the data and information described in this invention.

In addition to wireless link 26, central server 25 may be connected to mobile telecommunications network 15 via other connections 29, e.g. a hardwired link. Central server 25 may be co-located with mobile telecommunication network 15. For example, computer network 30 may be connected to the Internet 60 via dedicated landline services 50 through network hubs, bridges and routers 35. Dedicated, landline telecommunications services 50 may include Tl, ATM, DSL, frame relay, or other services provided by the telecommunications companies for connection to the Internet in general. Network connection 65 connecting Internet 60 and mobile telecommunications network 15 exists through any of the present or heretofore developed services that connect these two networks.

Figure 2:
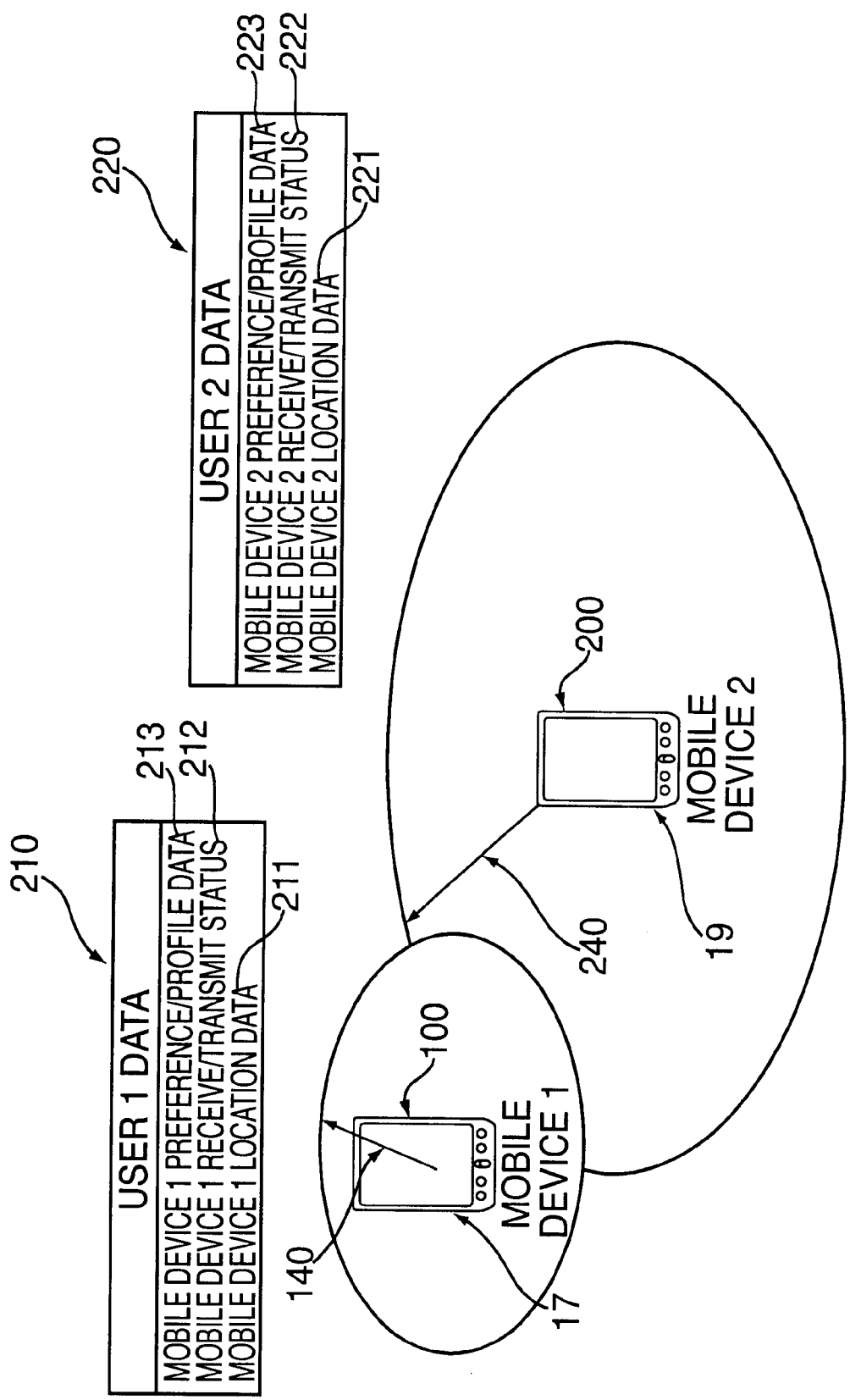
FIG. 2 is a logical diagram of two mobile communications devices and associated data according to one embodiment of the present invention.

FIG. 2 is a logical diagram showing the physical locations of the first and second mobile communications devices 17 and 19 and some of the data associated with those devices. In particular, first telecommunications device 17 is situated at first location 100 and second telecommunications device 19 is positioned at second location 200. First and second locations 100 and 200 are preferably determined by GPS transceivers within the mobile communications devices. The GPS data indicative of first and second locations 100 and 200 may be stored within a memory inside the mobile communications devices for later transmission over wireless links 18 and 20, shown in FIG. 1, to the central server 25. Alternatively, the GPS data reflecting the locations of the communications devices may be transmitted continuously to the central server 25 so as to accurately reflect the positions of those devices on a real-time basis.

Associated with each of the mobile communications devices 17 and 19 are data structures 210 and 220 respectively. The data within data structures 210 and 220 may be stored on the mobile communications devices themselves, on central server 25, or on the mass storage elements 40 within mobile telecommunications system 10. Regardless of the storage location, each mobile communications device has a data structure associated with it that contains a plurality of types of data.

The first data associated with the mobile communications devices are the above-mentioned GPS determined location data 211 and 221 indicative of first and second locations 100 and 200 respectively. As previously mentioned, this data is preferably generated by a GPS transceiver within the mobile communications devices and may be stored in memory within those devices prior to transmission to the central server 25.

The second data associated with the mobile communications devices are the receive/transmit statuses 212 and 222 for the mobile communications devices. As an example, the receive status data consists of a toggle bit within the wireless data stream transmitted over the wireless communications links that indicates whether the associated mobile communications device is accepting data or requests from other mobile communications devices or the central server 25. The transmit status data works similarly in that it indicates to the mobile communications device itself, whether requests or data should be sent to other mobile communications devices or to the central server. In one embodiment, the receive/transmit status may simply default to "available" according to the "power-on" or "ready status" condition of the mobile communications device. In that case, the data type 212, 222 would allow transmitting the data structures 210, 220 and receiving and accordingly would not require those datatypes. The same applies to the other embodiments. Alternatively, a user of the mobile communications device may toggle either of the above-described status conditions using data input means on the mobile communications device such as the keypad of a cell phone or a handwriting tablet portion of a PDA.

The third data associated with the mobile communications devices are the profile/preference data 213 and 223 for the mobile communications device or the user thereof. The commercial applications for the present invention are numerous and varied. Consequently, as provided in more detail below, the contents of the profile/preference data are likewise numerous and varied. At a fundamental level, however, the profile/preference data contain elements that uniquely identify the particular mobile communications device with which it is associated. Further, the profile data may reflect the particular preferences of the mobile communications device or its user. As with the status data, this data may be entered directly into the mobile communications device using input means on the device or may be integrated as part of the device, for example, embedded in the device firmware.

The profile/preference data held by the server for each user or mobile communications device may be generally divided into two parts. First, each user's or mobile communications device's profile data contains data related to the characteristics of the user or the device. As an example, the user's characteristic data may include that the user is a manager level employee who works in the Networking group at Xerox Corp. Second, the profile data may contain preference data for the user or device to be used by the central server in making the match. In the example above, the preference data may include other managers who also work at Xerox and who are in the same city (within approximately 20 miles). Thus the profiles may contain both specific information related to the users/device and the preference data for the user/device that is being sought. Further, the above-mentioned receive/transmit status 212 and 222 may actually be a data element within the preference/profile data 213 and 223. For example, the user may only wish to receive a matching notification from the central server after 5:00 P.M. on weekdays and sets his communications device availability accordingly.

The data contained within data structures 210 and 220 associated with first and second mobile communications devices 17 and 19 respectively may be entered and transmitted to one another and to the central server 25 in a number of ways. As previously mentioned, location data 211 and 221 may be transmitted directly to the other mobile communications device via a mobile telecommunications network 15 and/or transmitted to the central server 25 via any of its network connections shown in FIG. 1. The receive/transmit status 212 and 222 are typically entered on the mobile communications device to either activate or inactivate the receive and/or transmit status for that particular device. In this regard, the status may be either maintained within the memory associated with the mobile communications device, or may be transmitted directly to the other mobile communications devices or the central server. If the receive/transmit status 212 and 222 of the first and second mobile communications devices is stored within the memory of those devices, then the central server 25 may poll each of the mobile communications device on the mobile telecommunications network 15 in order to determine the appropriate status of those devices. Although such continuous polling is possible, a particularly preferred embodiment transmits the status of the mobile communications device to the central server 25 for storage within the memory associated with the central server so as to reduce the required transmission bandwidth for the mobile telecommunications network. Thus, mobile telecommunications data structures 210 and 220 may be stored within first and second mobile communications devices 17 and 19 respectively either in whole, or in part. Any portion of the data within those data structures not stored within the memory of the telecommunications devices themselves may be transmitted to the central server 25 for storage or to the other mobile communications devices within the network.

It should be appreciated that at least the preference/profile data 213 and 223 may be supplied to central server 25 via means other than the first and second mobile communications devices themselves. In particular, a personal computer 80, shown in FIG. 1, may be employed by a user of first mobile communications device 17 to transmit the preference/profile data 213 associated with that device to central server 25 or to the other mobile communications devices on the mobile communications system 10. Personal computer 80 associated with the first mobile communications device 17 does not necessarily need to be physically proximate to the first mobile communications device 17 during any operational phase of the present invention. For ease of data transfer, however, certain PDA and cell phones now offer synchronization software that permits data transfer between PCs and the mobile communications devices. The same physical relationship, or lack thereof, is true of other communications devices on the network.

According to a preferred embodiment of the present invention, the mobile communications system 10 operates as follows. First and second mobile communications devices 17 and 19 continuously transmit data, including their location data 211 and 221 determined by the embedded GPS transceiver, through wireless links 18 and 20 to mobile telecommunications network 15. Central server 25 receives the location data from the mobile communications devices via wireless link 26, connections 65 and 50 to the Internet 60 or other connections 29. In conjunction with the location data, mobile communications devices also transmit their receive/transmit status over the same wireless connections. The preference/profile data, however, has preferably been previously transmitted to the central server 25 for storage within its associated memory.

Figure 3:
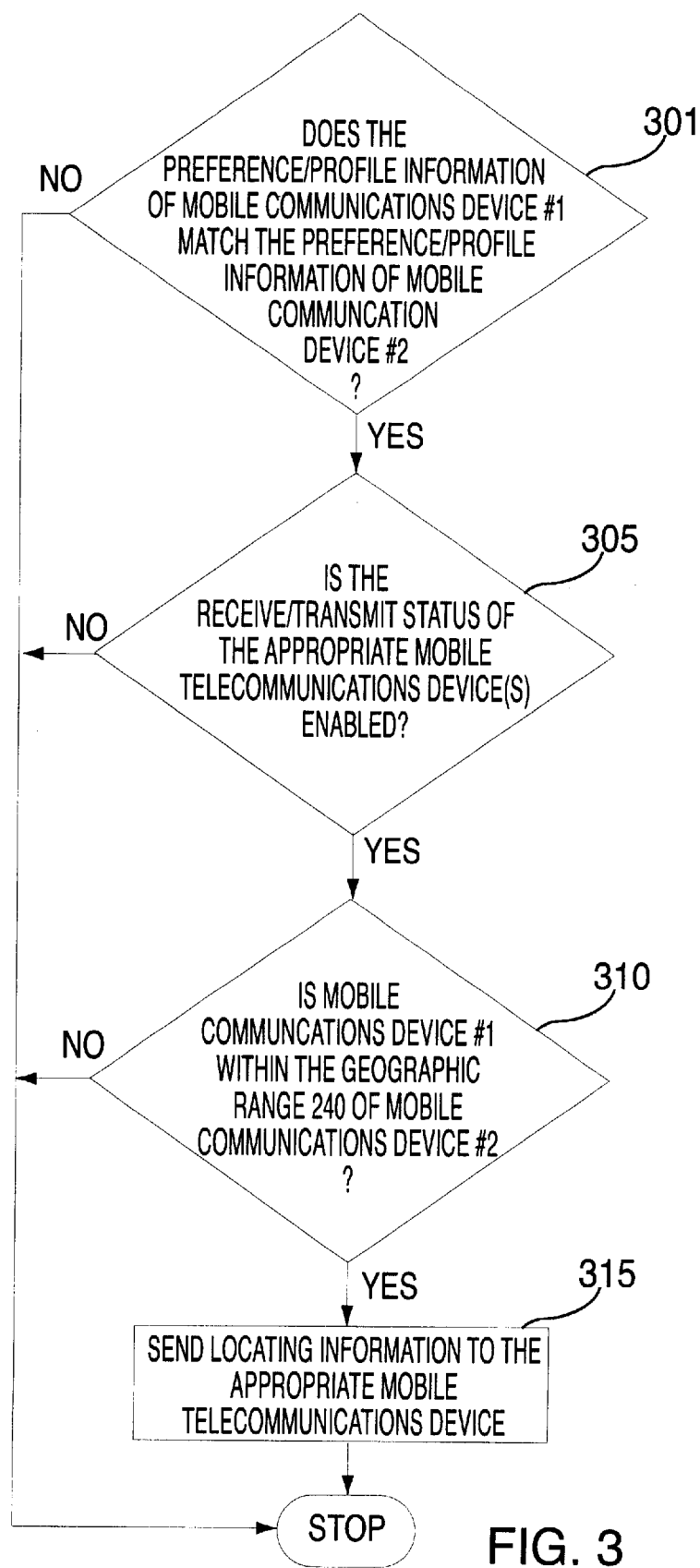
FIG. 3 is a flow chart showing a process for determining the delivery of information to mobile communications devices according to one embodiment of the present invention.

The decision making process executed by central server 25 in determining whether data should be sent is provided in the flow chart of FIG. 3. First, step 301, central server 25 performs a matching function between the profile/preference data 213 of the first mobile communications device 17 and the profile/preference data 223 associated with the second mobile communications device 19. If a match is made, central server 25 continues with step 305 and examines either one or both of the transmit/receive status data 212 and 222 associated with first and second mobile communications devices 17 and 19. If both devices are sending transmit/receive status data that permits them to notify one another of their physical proximity, then central server 25 determines in step 310 whether the first mobile communications device 17 is within a distance 240 of the second mobile communications device 19, as shown in FIG. 2.

After step 310, central server 25 continues with step 315 and causes locating information to be transmitted to either or both of the first and second mobile communications devices 17 and 19 indicating that a "matching" and "available" mobile communications device is in proximate relation to another. Such locating information may include either graphic or textual information and may be in any known format, e.g. a graphical map, textual directions, a video of the actual route to be traveled etc. Locating information may also be the raw GPS determined data. If any of the decision-making conditions in FIG. 3 are violated, then no data is transmitted by central server 25.

As refinements to the transmission of the profile/preference information above, the preference or personal data transmitted from the central server to the seeking party or the sought after party may be filtered, e.g. upon the information provider's request, so that certain, otherwise available data is not transmitted. Further, it should be recognized that additional data, for example location dependent data gleaned from Internet sources regarding real-time traffic or weather conditions, may also be transmitted to the receiving mobile communications device along with or in lieu of the profile/preference information.

In an alternate embodiment according to the present invention, the profile/preference data for each of the mobile communications devices may also reside in memories incorporated as part of the mobile communications devices. In this configuration, the profile/preference information, and receive/transmit statuses of the first and second mobile telecommunications devices are stored in the memory associated with the central server 25 and are used in steps 301 and 305 to determine an available match. Once the full proximity match is made at step 310, the profile/preference data stored on one mobile communications device is transmitted directly to the receiving mobile communications device, say for example, upon the receipt of an "ok-to-transmit" signal from the central server. In this configuration, the output transmission bandwidth from the central server is reduced since full profile/preference information in each transmission to and from communications devices is isolated between the sending and receiving mobile communications devices and does not involve the central server once the match is made and the appropriate communications devices are notified.

First mobile communications device 17 may also have its own associated proximity range, shown as distance 140 in FIG. 2. Distance 140, for example, may correspond to an independently selectable range within which the first mobile communications device 17 may wish to be notified and/or transmit its information regarding the possibility of a match, but only if second mobile communications device 19 is within that distance range. Consequently, the central server 25 processing at step 310 in FIG. 3 would compare the location data 211 and 221 with both distances 240 and 140 respectively and would only proceed to step 315 if both distance conditions are satisfied. It should be recognized that the first and second distances 140 and 240 may be selected in real-time, by the mobile communications device user for example, and transmitted to central server 25 as profile/preference data along with the location data and the receive/transmit status data.

As a hybrid arrangement of the above, if the first and second distances 140 and 240 are unequal, it is possible to have the central server notify the mobile communications device having the longer distance of the presence of another matching device without notifying the mobile communications device having a shorter distance. In this instance, the communications device having the shorter distance may also receive a special message saying, for example, that another matching and available user is "not in your range, but you are in his. Do you want to meet?".

The applications to which the present invention may be directed are numerous. The distinction between them lies primarily in the types of data provided in the profile/preference data associated with the mobile communications devices and used to perform the matching of step 301 in FIG. 3. In a particularly preferred application, the first and second mobile communications devices 17 and 19 are used by subscribers of a matchmaking or dating service. The mobile communications devices, e.g., web-enabled cellular telephones, transmit their location data to central server 25 as previously described. Each of the users associated with the cell phones employs the input key pad thereon to indicate their availability as a potential match on a real-time basis by keying in their transmit/receive status using the cell phone keypad. As one practical example, two teens in a shopping mall may wish to meet other teens according to specified criteria. In addition to inputting an availability status, the teens may also use their cell phones to dynamically indicate a physical proximity within which the match must be located by specifying a distance, area or volume preference, e.g., 500 feet away, same floor, same mall wing. Finally, the preference data upon which the match is to be based may also be entered in real-time by the teens using the cell phone keypad. Alternatively, the preference data may have been previously entered offline via a personal computer and transmitted to the central server 25. The matchmaking preference data may include, for example, the gender of the potential match, or the religious, social or economic characteristics of the potential match.

In the above scenario, if a male teenager wishes to meet a female teenager of the same religious background, then that data is entered by the male teenager on his mobile communications device as the male teenager walks through the mall. The preference data is then transmitted to central server 25 which begins to search for matches based on information according to step 301 of FIG. 3. Upon finding all matches, the receive/transmit statuses of the potential matching female teenagers are determined, corresponding to step 305 of FIG. 3. Based upon the set of "available matches", the central server then monitors the locations of all "available matches" to determine when they are within a default or user specified distance of the requesting male teenager, as in step 310 of FIG. 3. Upon finding an available, proximate match, the central server then transmits data to the requesting male teenager indicating a matching female teenager has been found. In this regard, the seeking male teenager may receive the location and/or the personal information for the matching female teenager, including the religion if the receive status of the matching female calls for information to be sent. Alternatively, the matching female teenager may also receive the location and/or preference data of the requesting male teenager.

As another example of a matchmaking service, business travelers may wish to locate a particular business service on a nearest available basis when traveling in an unknown area. For example, to determine the nearest available hairdresser, a business traveler may input his or her preferences for a particular type of hair dresser, e.g. salon or barber, from which services are desired. All hairdressers that have indicated that they have available appointments within five miles of the business traveler, for example, may be sent the cell phone number of the traveler so that he may be contacted to set up an appointment.

In another, similar commercial embodiment, an unoccupied taxi/passenger matching system may be implemented by a system operating according to the present invention. In this system, a passenger desirous of taxi service is matched immediately and directly with the nearest unoccupied taxi.

In another commercial application of the present invention, an automated scheduling function is implemented to determine a common meeting place for a plurality of attendees. In this application, a plurality of mobile communications devices, all being identifiable subscribers of a particular group, are distributed within a particular distance of one another. The central server may be provided with a time at which the plurality of users wish to meet, and based upon the instantaneous location data of the plurality of users as provided to the central server by their mobile communications devices, the central server 25 may select a convenient meeting place from a predetermined list of available meeting places stored within its memory. In this commercial embodiment, the profile data for each of the mobile communications devices would include, for example, a subscription group identifier that identifies those mobile communications devices as members of the meeting group. Provided each of the mobile communications devices have activated their receive/transmit status, the central server 25 transmits a message to each of the mobile communications devices prior to the pre-arranged meeting time indicating the time and the location of the meeting. In a variation of this commercial embodiment, the potential meeting attendees may be provided with a menu of possible meeting locations by the central server 25 from which each responds by selecting a preferred meeting location. The meeting location selected from each mobile communications device is then transmitted to the central server which selects one location based upon a selection algorithm or set of heuristics. The central server then transmits the selected meeting location to all of the attendees' mobile communications devices.

In yet another commercial embodiment of the present invention, the mobile telecommunications system according to the present invention provides an optimized matching system for shipping packages. In this system, dynamic rerouting of packages is performed by the central server based on the location of the packages and the routes of drivers delivering those packages. For example, package driver 1 having a first mobile communications device and providing profile data indicating his route and the package contents of his truck may be determined to be within a certain proximity of a second package driver having a second mobile communications device that provides profile data indicating his route and the package contents of his truck. If the central server determines that one or more of the packages on the first driver's truck are more efficiently delivered if placed on the second driver's truck, then the central server transmits a message to the two drivers indicating a convenient meeting place. If, however, the drivers have timed delivery commitments, as shown in their package profile information or by either driver's indication of an unavailable receive/transmit status on his mobile communications device, then a meeting is not suggested by the server and no notices are sent to the drivers. In this way, a real-time optimization of package shipping may be effected.

In another commercial implementation of the optimized package shipping embodiment, a driver whose package delivery truck has broken down may transmit its position to central server 25. In this embodiment, each truck will have its own GPS-based communications device so that the location of the disabled truck and the locations of nearby available trucks are known to central server 25. The package delivery information for all the packages on the truck would be contained in the package profile associated with of the broken-down truck, which may be compared with the package delivery profiles of the nearest available delivery trucks by central server 25 to determine the best truck or trucks to which the packages may be transferred. The central server may then reroute and reassign those packages on the broken down truck to one or more of the remaining package delivery vehicles that comes to the aid of the broken-down vehicle on a real-time basis.

In yet another commercial embodiment according to the present invention, an object finder or object-carrier tracking system may be implemented in which both a valuable, tangible good, e.g. currency bags, and a carrier of the good both contain a GPS position transmission ability. During normal transportation of the currency, both the object and the carrier are at the same geographic location at the same time. However, if the goods are stolen and the currency becomes separated from the carrier, a warning indicator may be forwarded by the central server 25 when, for example, the physical distance between the goods and the carrier becomes greater than a maximum set threshold. In this commercial embodiment, the profile data for the two mobile communications devices would be an association group including location data indicating a maximum permissible separation distance. It is noted from this commercial embodiment that separation distances as well as proximity ranges may be applied according to the present invention.

In yet another commercial embodiment according to the present invention, computer-mediated activity on an aggregate level may be coordinated through the use of a mobile telecommunications system. As one example, the central server may track the locations of a plurality of persons or entities via their mobile communications devices. Based upon those detected positions and an applied group of heuristics, an optimal course of action may then be determined for the plurality of persons. The group of heuristics may be devolved from past and/or similar situations, such that an optimal plan for managing those people or entities are easily used to solve a particular problem. One example might be to direct the location of troops in a military theater where the positions of friendly and enemy troops are known. The central server would apply an optimal battle strategy based upon the transmitted positions of the troops and redirect their activities to adopt new positions. In another application, a forest fire fighting team may have its actions in a remote area coordinated through the use of mobile communications devices and a remote positioning system in which locations of the remotely located fire fighting members are otherwise difficult to coordinate.

In another commercial embodiment according to the present invention, animals or livestock may be fitted with mobile telecommunications capabilities so as to provide information regarding potential husbandry matches within their roaming areas. For some animals and livestock, the roaming areas are typically larger areas than are monitored by conventional techniques. In this commercial example, the profile information for each of the animals would include criteria that may be used to provide the most optimal mating for the animals based on their physical proximity to other animals of desirable mating characteristics.

In another commercial embodiment, an efficient human donor matching system is implemented by tracking the locations of human donors of blood, genes or organs and matching the donors with needy recipients. In this example, the profile data for each person would include a blood type, available organs for donation, and/or genetic characteristics of the donor. Upon the request of a potential recipient, a matching donor physically close to the recipient may be quickly identified. In addition, passive identification and storage of people with the same preferences, e.g. blood type., may also be effected for future use. In this system, the central server would track the locations and blood types of all persons in a community. If a person having a rare blood type AB- enters the community, their location would be tracked as well. Then, when an emergency situation arises in which a person needs a transfusion of the rare blood type, potential donors may be contacted that are within a viable transportation distance from the person in need. In this matching system, a passive match making system is provided, i.e., one in which the match is not known to either user. The users, of course, may be provided the ability to participate in a such donation program by setting their "availability" appropriately.

Figure 4:
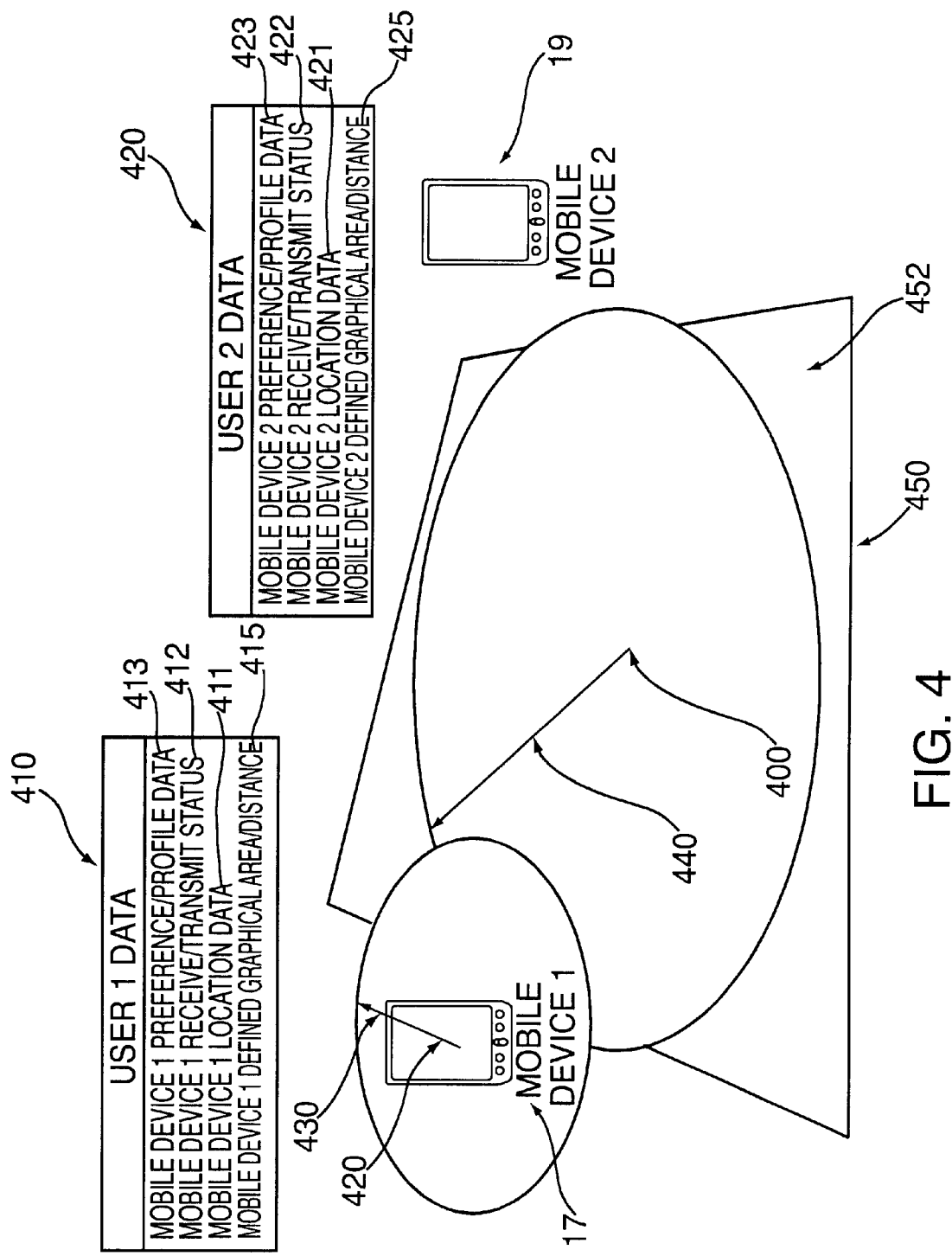
FIG. 4 is another logical diagram of two mobile communications devices and associated data according to another embodiment of the present invention.

According to another embodiment of the present invention, FIG. 4 shows an alternative arrangement of the physical locations of the first and second mobile communications devices 17 and 19 and some of the data associated with those devices. Unlike the arrangement of FIG. 2, the first telecommunications device 17 is disposed at location 420 with respect to a fixed location 400 rather than with respect to the second telecommunications device 19. As with the embodiment of FIG. 2, the location data 411 for first mobile communications device 17 is preferably determined by GPS transceivers and transmitted to a central server 25 through the wireless link 18 shown in FIG. 1. Unlike the embodiment shown on FIG. 2, however, a proximate location determination for the first mobile communications device 17 is made when the first mobile communications device is within distance 440 of the fixed location 400 rather than with respect to a distance from the second mobile communications device 19. Thus, the second mobile communications device 19 may be located anywhere, although in FIG. 4 it is shown to be beyond distance 440 of fixed location 400. In this second embodiment, the information transmitted to the first mobile communication device may include a data that the device is inside or outside the distance 440 of fixed point 400. Further, this information may also be transmitted to the second mobile communications device 19 on a real-time basis or at some later time.

Those skilled in the art will appreciate that an arbitrary boundary 450 containing fixed location 400 may be substituted for fixed or more regularly defined distance 440 with respect to fixed location 400. Additional boundary data 415 and 425 may be included as part of data structures 410 and 420 to assist in defining the bounded area 452 and in determining the position of the first mobile communications device with respect thereto. As with other data, the boundary data 415 and 425 may be transmitted from the mobile communications devices in real-time or may be pre-stored within the memory associated with central server 25 prior to any proximity determinations.

The mobile telecommunications network in FIG. 1 may be modified to include position determining means other than a GPS positioning system. In particular, a well defined bounded area 452 may contain its own network of short distance, radio-controlled transceivers or location fixing devices within the boundaries of a confined geographical area. Such transceivers may be used to triangulate the position of a mobile communications device based on the transmission and return of signals between those transceivers and the devices themselves. Similarly, the boundary 450 may be maintained by perimeter sensors, e.g. those used by the invisible dog fence. Messages and locations may be transmitted based on the position of the persons within or without the perimeter 450 as determined by the perimeter sensors and discussed above.

Figure 5:
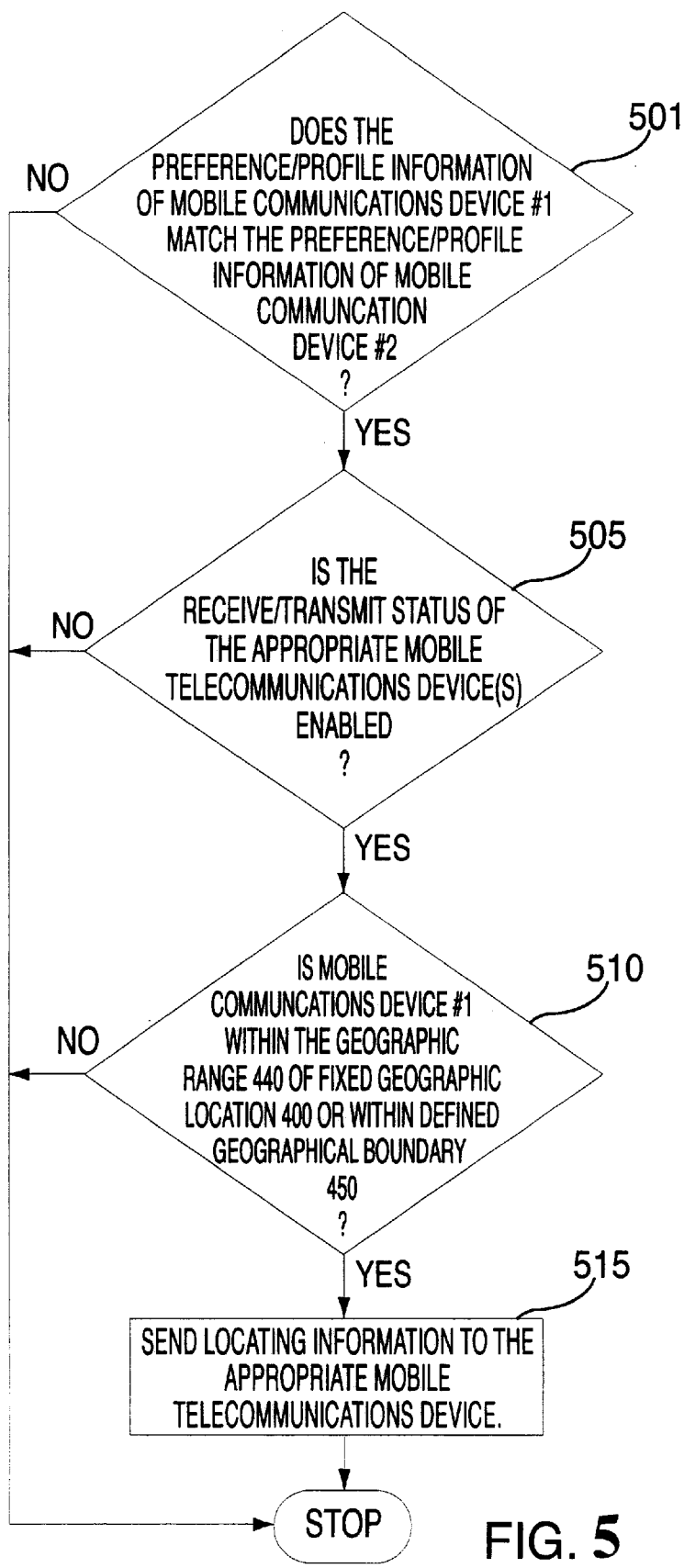
FIG. 5 is a flow chart showing a process for determining the delivery of information to mobile communications devices according to another embodiment of the present invention.

The flow chart of FIG. 5 provides the decision making process executed by central server 25 in determining whether to send data according to this second embodiment. First, at step 501, central server 25 performs a matching function between the profile/preference data 413 of the first mobile communications device 17 and the profile/preference data 423 associated with the second mobile communications device 19. If a match is made, central server continues with step 505 and examines either one or both of the receive status data 412 of the first mobile communications device 17 and the transmit status data 422 of the second mobile communications device 19. If both devices are sending transmit/receive status data that permits them to notify one another of their physical proximity, then central server 25 determines at step 510 whether first mobile communications device 17 is within distance 440 of the fixed location 400. Alternatively, when a fixed boundary 450 is used, the central server determines whether the first mobile communications device 17 is within the perimeter of the fixed boundary 450 at step 510. If so, central server 25 continues with step 515 and causes locating information to be transmitted to either or both of the first and second mobile communications devices 17 and 19 indicating that a "matching" and "available" mobile communications device is in proximate relation to the fixed point or is disposed inside/outside the fixed boundary. If any of decision making conditions are violated in the flow of FIG. 5, then no data is transmitted by central server 25.

As with the first embodiment, first mobile communications device 17 may also have its own associated proximity range, shown as distance 430 in FIG. 4. Distance 430, for example, may correspond to an independently selectable range within which the first mobile communications device 17 may wish to be notified and/or transmit its information regarding the possibility of a match, but only if it is within distance 430 of fixed point 400. Consequently, the central server 25 processing at step 510 in FIG. 5 would compare the location data 411 and fixed location 400 and would only proceed to step 515 if both distance conditions, 430 and 440, are satisfied. It should be recognized that the first and second distances 430 and 440 may be selected in real-time, by the mobile communications device user for example, and transmitted to central server 25 as profile/preference data along with the location data and the receive/transmit status data.

Also as in the first embodiment, a hybrid arrangement of the above system is possible. If the first and second distances 430 and 440 are unequal, it is possible to have the central server notify the mobile communications device having the longer distance of the presence of another matching device without notifying the mobile communications device having a shorter distance. In this instance, the communications device having the shorter distance may also receive a special message saying, for example, that "you are outside/inside the designated range or perimeter but the center location is not within your range."

In a variation of either the first or second embodiments, one or both of the mobile communications devices may be connected to the Internet via traditional land lines. New generation phones that have both cellular and wireless capabilities, for example, may be used to receive and transmit information over a cellular network or the traditional land line telecommunications network. In addition, the user profiles may specify a communications device, phone number or other address other than one associated with itself to receive the matching and locating information transmitted by the central server. As one example, the central server may determine that the GPS determined location of the receiving mobile communications device is a home or a work location. This information could then be used by the central server to route the transmitted information over traditional land lines, using text-to-voice conversion for example, to transmit the information over a regular telephone line or to an email address/URL that is known to be associated with that location.

In one commercial embodiment according the second embodiment of the present invention, parents may locate their children within an amusement park or monitor their children's physical presence within the park. In this embodiment, both the parents and the children are equipped with mobile communications devices. The profile data 413 for the roving child holding first mobile communications device 17 would contain data identifying the second mobile communications device as its parent as well as geographic boundary data 415 that identifies a containment distance 440 or a boundary 450. When the child exceeds the distance 440 or exits area boundary 450, data is sent by the central server to one or both of the first and second mobile communications devices indicating that condition. In this amusement park scenario, information may be sent to a lost child's mobile communications device indicating that they have left the fixed boundary of the park, or other confinement area specified by the parent. Additionally, the child's mobile communications device may be provided with the location of the parent based on the location data 421 associated with the second mobile communications device. Using this information, the child may find the parent regardless of whether the second mobile communications device used by them is inside or outside the fixed distance or boundary area.

According to another commercial embodiment of this invention, a virtual sign-out system may be implemented in which a number of items may be tracked within a defined physical area or volume. Once an object that contains a mobile communications device exceeds a distance from a fixed location or exits a boundary area, the central server 25 receives a log-out command as part of the data transmission of step 515. The logout command indicates that the object is leaving the specified area and is recorded as being removed therefrom. To complement this, the associative techniques described above with respect to the object finding commercial embodiment may be used to match that item leaving the geographic boundary with a person, also carrying a mobile communications device, such that ownership of that device is now associated with that user. Thus, this embodiment may be practically applied to include the check out of library books, video rentals or valuable equipment, such as work-related assets removed from the employment premises by employees.

As another commercial example of the second embodiment, a user having a mobile communications device may transmit data to the central server 25 when it is within a particular distance of a fixed location so as to leave a virtual "calling card" with the server indicating that the user was there at some point in time. The data transmitted to the central server may indicate not only the user's presence but also the interests of that user. As an example, the user's desire to acquire certain types of comics, or stamps in a pawnshop may be forwarded to the computer server. Subsequent users of the mobile communications devices entering the pawn shop, i.e. those entering within a fixed distance of the shop or physically entering within the four walls of the shop, are subsequently notified upon their proximity detection by the central server that the first user was previously present. The subsequent visitors would then be forwarded additional information regarding all previous visitors along with their reasons for leaving the "calling cards". In essence, this commercial embodiment is a latent version of the matchmaking embodiment described with respect to the first embodiment above.

In yet another commercial embodiment according to the present invention, a flea market vendor located in a fixed booth may transmit information concerning his products to the mobile communications devices that are configured to receive such data and which have indicated a preference for receiving such data. The shoppers are transmitted the location of the flea market vendor or are notified when passing within a given distance of the matching vendor sites or when entering their store.

In yet another commercial embodiment according to the present invention, an empty parking spot locator is implemented according to the present invention. The driver of an automobile having a mobile communications device would send a message to the central server upon departing its parking spot (a fixed location or boundary) indicating the vacancy. Other cars within the parking lot searching for an open spot and possessing mobile communications devices would be notified of the vacant spot and the position of the spot via message communication with the central server 25. More particularly, the users may be sequentially notified based on their own physical proximity to the open spot so that a rush for that open spot is avoided.

While particular embodiments and applications of the invention have been shown and described, it will be obvious to those skilled in the art that the specific terms and figures are employed in a generic and descriptive sense only and not for the purposes of limiting or reducing the scope of the broader inventive aspects herein. By disclosing the preferred embodiments of the present invention above, it is not intended to limit or reduce the scope of coverage for the general applicability of the present invention. Persons of skill in the art will easily recognize the substitution of similar components and steps in the apparatus and methods of the present invention.

We claim:

1. A system for matching users of mobile communications devices comprising:

a first mobile communications device for transmitting information defining a location of the first mobile communications device and a user receiving status;

a second mobile communications device for transmitting information defining a location of the second mobile communications device and a user receiving status; and a central unit having a processor coupled to a memory, the central unit capable of communicating with the first mobile communications device over a first wireless communications link and with the second mobile communications device over a second wireless communications link, the memory storing a first user profile including information associated with a user of the first mobile communications device and a second user profile including information associated with a user of the second mobile communications device, wherein the central unit receives the user receiving statuses and the information defining the locations of the first and the second mobile communications devices and wherein the processor receives the first and the second user profiles to match information of the users and, if there is a match and depending upon the user receiving statuses, effects the transmission to the first mobile communications device of locating information for the second mobile communications device and effects the transmission to the second mobile communications device of locating information for the first mobile communications device, the locating information for each of the devices being based upon the information defining the locations of the first and the second mobile communications devices.

2. The system according to claim 1, wherein the first user profile and the second user profile each includes a location, area, or volume and the match of information of the users includes a match of the location, area, or volume contained in the first user profile with the location of the second mobile communications device and a match of the location, area, or volume contained in the second user profile with the location of the first mobile communications device.

3. The system according to claim 1 or 2, wherein the user receiving status of at least one of the first mobile communications device and the second mobile communications device is provided by a power-on state of that mobile communications device.

4. A system for matching users of mobile communications devices comprising:

a first mobile communications device for transmitting information defining a location of the first mobile communications device and a user receiving status;

a second mobile communications device for transmitting information defining a location of the second mobile communications device; and a central unit having a processor coupled to a memory, the central unit capable of communicating with the first mobile communications device over a first wireless communications link and with the second mobile communications device over a second wireless communications link, the memory storing a first user profile including information associated with a user of the first mobile communications device and a second user profile including information associated with a user of the second mobile communications device, wherein the central unit receives the user receiving status from the first mobile communications device and the information defining the locations of the first and the second mobile communications devices and wherein the processor receives the first and the second user profiles to match information of the users and, if there is a match and depending upon the user receiving status, effects the transmission to the first mobile communications device of locating information based upon the information defining the locations of the first and the second mobile communications devices.

5. The system according to claim 4, wherein the first user profile includes a location, area, or volume and the match of information of the users includes a match of the location, area, or volume with the location of the second mobile communications device.

6. The system according to claim 4 or 5, wherein the user receiving status is provided by a power-on state of the first mobile communications device.

7. A system for matching users of mobile communications devices comprising:

a first mobile communications device for transmitting information defining a location of the first mobile communications device;

a second mobile communications device for transmitting information defining a location of the second mobile communications device and a user sending status; and a central unit having a processor coupled to a memory, the central unit capable of communicating with the first mobile communications device over a first wireless communications link and with the second mobile communications device over a second wireless communications link, the memory storing a first user profile including information associated with a user of the first mobile communications device and a second user profile including information associated with a user of the second mobile communications device, wherein the central unit receives the user sending status from the second mobile communications device and the information defining the locations of the first and the second mobile communications devices and wherein the processor receives the first and the second user profiles to match information of the users and, if there is a match and depending upon the user sending status, effects the transmission to the first mobile communications device of locating information based upon the information defining the locations of the first and the second mobile communications devices.

8. The system according to claim 7, wherein the first user profile includes a location, area, or volume and the match of information of the users includes a match of the location, area, or volume with the location of the second mobile communications device.

9. The system according to claim 7 or 8, wherein the user sending status is provided by a power-on state of the second mobile communications device.

10. The system according to any of claims 1, 4 or 7, wherein at least one of the first and the second mobile communications devices includes an input device for inputting the profile information.

11. The system according to any of claims 1, 4 or 7, wherein the user profile information includes characteristics of the user and preferences of the user, and the match of information of the users includes matching preferences of the first user with characteristics of the second user and preferences of the second user with characteristics of the first user.

12. The system according to claim 11, wherein at least one characteristic of at least one user and at least one preference of at least one user are selected from the group consisting of a business relationship, a social relationship, a family relationship, physical characteristics, food, clothing, an activity, sports, entertainment, music, and video.

13. The system according to any of claims 1, 4 or 7, wherein at least one of the first mobile communications device and the second mobile communications device comprises a cellular phone, a pager, a personal data assistant, a global positioning system receiver, a transponder, a radio, a walkie-talkie, or a wireless Internet access device.

14. The system according to any of claims 1, 4 or 7, wherein the information defining the location of at least one of the first mobile communications device and the second mobile communications device includes an address, an intersection, a landmark, a marker, co-ordinates, or a telephone number.

15. The system according to any of claims 1, 4 or 7, wherein the locating information includes a map, vectors, directions, and an address.

16. The system according to any of claims 1, 4 or 7, wherein the locating information includes audio information, video information, textual information, or graphical information.

17. The system according to any of claims 1, 4 or 7, wherein the locating information is updated to track a movement of at least one of the first and the second mobile communications devices.

18. The system according to any of claims 1, 4 or 7, wherein the central unit transmits additional information to at least one of the first and second mobile communications devices with the locating information.

19. The system according to claim 18, wherein the additional information is obtained over the Internet.

20. The system according to any of claims 1, 4 or 7, wherein the user profile of at least one of the first mobile communications device and the second mobile communications device includes information identifying the user of the other mobile communications device.

21. The system according to claim 4 or 7, wherein the locating information is locating information for the second mobile communications device.

22. The system according to claim 4 or 7, wherein the locating information is locating information for a location other than the location of either the first mobile communications device or the second mobile communications device.

* * * * *

(12) EX PARTE REEXAMINATION CERTIFICATE (10870th)
United States Patent
Drutman et al.

(10) Number: US 6,618,593 C1
(45) Certificate Issued: May 19, 2016

(54) LOCATION DEPENDENT USER MATCHING SYSTEM

(75) Inventors: Charles Drutman, Lynnfield, MA (US);
Darlene Drutman, Lynnfield, MA (US);
Andrew Egendorf, Lincoln, MA (US);
Norton Greenfeld, Wayland, MA (US);
Eugene Pettinelli, Sudbury, MA (US)

(73) Assignee: Black Hills Media, LLC

Reexamination Request:
No. 90/013,503, May 4, 2015

Reexamination Certificate for:
Patent No.: 6,618,593
Issued: Sep. 9, 2003
Appl. No.: 09/658,671
Filed: Sep. 8, 2000

(51) Int. Cl.
*G08B 21/00* (2006.01)
*G08B 21/02* (2006.01)
*H04M 3/42* (2006.01)
*H04W 4/02* (2009.01)
*H04L 29/08* (2006.01)
*G08B 1/08* (2006.01)
*H04W 8/18* (2009.01)

(52) U.S. Cl.
CPC .............. *H04W 4/02* (2013.01); *G08B 21/028* (2013.01); *G08B 21/0222* (2013.01); *G08B 21/0283* (2013.01); *G08B 21/0294* (2013.01); *H04L 67/18* (2013.01); *H04M 3/42* (2013.01); *H04W 4/021* (2013.01); *H04W 4/023* (2013.01); *H04W 4/028* (2013.01); *G08B 2001/085* (2013.01); *H04M 2207/18* (2013.01); *H04M 2242/30* (2013.01); *H04W 8/18* (2013.01)

(58) Field of Classification Search
CPC ........................................................ H04M 3/42
USPC .................. 455/456.1, 414.2, 266; 342/357.2
See application file for complete search history.

(56) References Cited

To view the complete listing of prior art documents cited during the proceeding for Reexamination Control Number 90/013,503, please refer to the USPTO's public Patent Application Information Retrieval (PAIR) system under the Display References tab.

*Primary Examiner* — James Menefee

(57) ABSTRACT

A system and method for matching first and second mobile communications devices are provided. Preference or profile information associated with the first and second mobile communications devices is transmitted to a central server for matching the first and second devices. Location information and transmission statuses of the first and second mobile communications device are also transmitted to the central server. Data related to the location of either device is transmitted to the other device depending upon the matched statuses of the mobile communications devices and the location and transmission status information associated with the mobile communications devices.

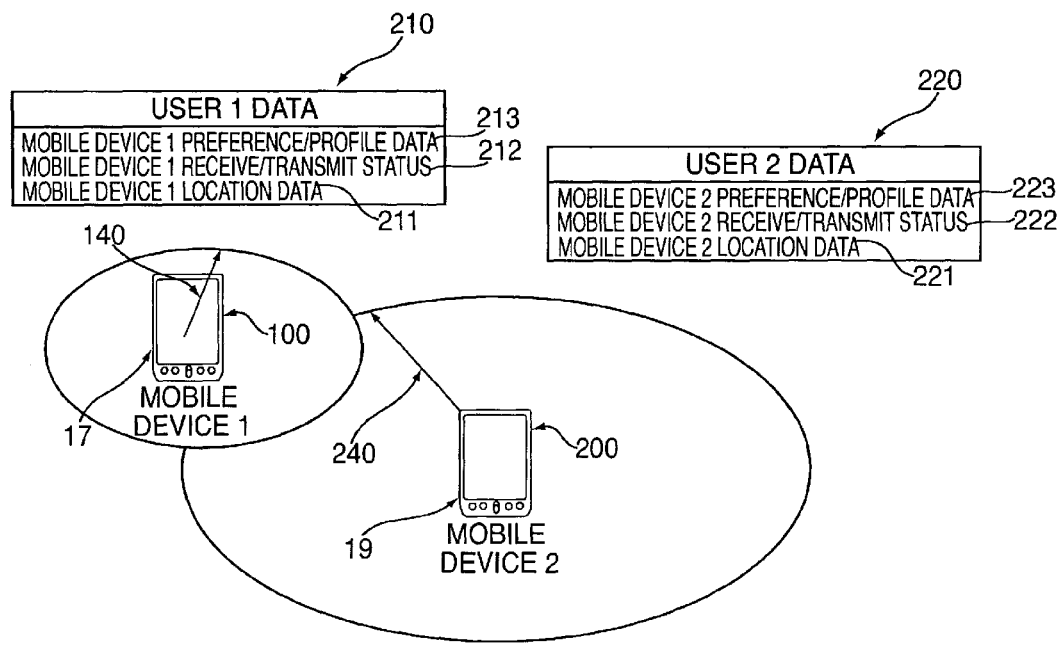

US 6,618,593 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-22 are cancelled.

New claims 23-95 are added and determined to be patentable.

*23. A system for matching users of mobile communications devices comprising:*
  *a first mobile communications device for transmitting first information to a central unit defining a location of the first mobile communications device, for transmitting second information to the central unit defining first user profile information, and for transmitting third information to the central unit defining a first user receiving status, the first user receiving status indicating that the first mobile communications device is currently on and is currently available to receive information including second locating information for a second mobile communications device from the central unit, wherein the first information, the second information, and the third information are transmitted separately to the central unit;*
  *the second mobile communications device for transmitting fourth information to the central unit defining a location of the second mobile communications device, for transmitting fifth information to the central unit defining second user profile information, and for transmitting sixth information to the central unit defining a second user receiving status, the second user receiving status indicating that the second mobile communications device is currently on and is currently available to receive information including first locating information for the first mobile communications device from the central unit, wherein the fourth information, the fifth information, and the sixth information are transmitted separately to the central unit; and*
  *the central unit having a processor coupled to a memory, the central unit capable of communicating with the first mobile communications device over a first wireless communications link and with the second mobile communications device over a second wireless communications link, the memory storing a first user profile including information associated with a user of the first mobile communications device and a second user profile including information associated with a user of the second mobile communications device, wherein the central unit receives the user receiving statuses and receives the information defining the locations of the first and the second mobile communications devices and wherein the processor receives the first and the second user profiles to match information of the users and, if there is a match and depending upon a current status of each of the first user receiving status and the second user receiving status indicating information will be accepted, effects a first transmission to the first mobile communications device of second locating information for the second mobile communications device comprising routing information usable for the first user to arrive at a location of the second mobile communications device and effects a second transmission to the second mobile communications device of the first locating information for the first mobile communications device comprising routing information usable for the second user to arrive at a location of the first mobile communications device, the first and second locating information being based upon the first and fourth information defining the locations of the first and the second mobile communications devices.*

*24. The system according to claim 23, wherein the first user profile and the second user profile each includes a location, area, or volume and the match of information of the users includes a match of the location, area, or volume contained in the first user profile with the location of the second mobile communications device and a match of the location, area, or volume contained in the second user profile with the location of the first mobile communications device.*

*25. The system according to claim 23, wherein at least one of the first and the second mobile communications devices includes an input device for inputting the profile information.*

*26. The system according to claim 23, wherein the user profile information includes characteristics of the user and preferences of the user, and the match of information of the users includes matching preferences of the first user with characteristics of the second user and preferences of the second user with characteristics of the first user.*

*27. The system according to claim 26, wherein at least one characteristic of at least one user and at least one preference of at least one user are selected from the group consisting of a business relationship, a social relationship, a family relationship, physical characteristics, food, clothing, an activity, sports, entertainment, music, and video.*

*28. The system according to claim 23, wherein at least one of the first mobile communications device and the second mobile communications device comprises a cellular phone, a pager, a personal data assistant, a global positioning system receiver, a transponder, a radio, a walkie-talkie, or a wireless Internet access device.*

*29. The system according to claim 23, wherein the information defining the location of at least one of the first mobile communications device and the second mobile communications device includes an address, an intersection, a landmark, a marker, coordinates, or a telephone number.*

*30. The system according to claim 23, wherein the locating information includes audio information, video information, textual information, or graphical information.*

*31. The system according to claim 23, wherein the locating information is updated to track a movement of at least one of the first and the second mobile communications devices.*

*32. The system according to claim 23, wherein the central unit transmits additional information to at least one of the first and second mobile communications devices with the locating information.*

*33. The system according to claim 32, wherein the additional information is obtained over the Internet.*

*34. The system according to claim 23, wherein the user profile of at least one of the first mobile communications device and the second mobile communications device includes information identifying the user of the other mobile communications device.*

*35. A system for matching users of mobile communications devices comprising:*
  *a first mobile communications device for transmitting first information to a central unit defining a location of the* first mobile communications device, for transmitting
second information to the central unit defining first user
profile information, and for transmitting third information to the central unit defining a user receiving status,
the user receiving status indicating that the first mobile
communications device is currently on and is currently
available to receive information including second locating information for a second mobile communications
device from the central unit, wherein the first information, the second information, and the third information
are transmitted separately to the central unit;

the second mobile communications device for transmitting
fourth information to the central unit defining a location
of the second mobile communications device and for
transmitting fifth information to the central unit defining
second user profile information to the central unit,
wherein the fourth information and the fifth information
are transmitted separately to the central unit; and the central unit having a processor coupled to a memory,
the central unit capable of communicating with the first
mobile communications device over a first wireless communications link and with the second mobile communications device over a second wireless communications
link, the memory storing a first user profile including
information associated with a user of the first mobile
communications device and a second user profile
including information associated with a user of the second mobile communications device, wherein the central
unit receives the user receiving status from the first
mobile communications device and the information
defining the locations of the first and the second mobile
communications devices and wherein the processor
receives the first and the second user profiles to match
information of the users and, if there is a match and
depending upon a current status of the user receiving
status indicating information will be accepted, effects
the transmission to the first mobile communications
device of locating information based upon the first and
fourth information defining the locations of the first and
the second mobile communications devices, the locating
information comprising routing information usable for
the first user to arrive at a location of the second mobile
communications device.

36. The system according to claim 35, wherein the first user profile includes a location, area, or volume and the match of information of the users includes a match of the location, area, or volume with the location of the second mobile communications device.

37. The system according to claim 35, wherein at least one of the first and the second mobile communications devices includes an input device for inputting the profile information.

38. The system according to claim 35, wherein the user profile information includes characteristics of the user and preferences of the user, and the match of information of the users includes matching preferences of the first user with characteristics of the second user and preferences of the second user with characteristics of the first user.

39. The system according to claim 38, wherein at least one characteristic of at least one user and at least one preference of at least one user are selected from the group consisting of a business relationship, a social relationship, a family relationship, physical characteristics, food, clothing, an activity, sports, entertainment, music, and video.

40. The system according to claim 35, wherein at least one of the first mobile communications device and the second mobile communications device comprises a cellular phone, a pager, a personal data assistant, a global positioning system receiver, a transponder, a radio, a walkie-talkie, or a wireless Internet access device.

41. The system according to claim 35, wherein the information defining the location of at least one of the first mobile communications device and the second mobile communications device includes an address, an intersection, a landmark, a marker, coordinates, or a telephone number.

42. The system according to claim 35, wherein the locating information includes audio information, video information, textual information, or graphical information.

43. The system according to claim 35, wherein the locating information is updated to track a movement of at least one of the first and the second mobile communications devices.

44. The system according to claim 35, wherein the central unit transmits additional information to at least one of the first and second mobile communications devices with the locating information.

45. The system according to claim 44, wherein the additional information is obtained over the Internet.

46. The system according to claim 35, wherein the user profile of at least one of the first mobile communications device and the second mobile communications device includes information identifying the user of the other mobile communications device.

47. The system according to claim 35, wherein the locating information is locating information for the second mobile communications device.

48. The system according to claim 35, wherein the locating information is locating information for a location other than the location of either the first mobile communications device or the second mobile communications device.

49. A system for matching users of mobile communications devices comprising:

a first mobile communications device for transmitting first
information to a central unit defining a location of the
first mobile communications device and for transmitting
second information to the central unit defining first user
profile information, wherein the first information and the
second information are transmitted separately to the
central unit;

a second mobile communications device for transmitting
third information to the central unit defining a location
of the second mobile communications device, for transmitting fourth information to the central unit defining
second user profile information, and for transmitting to
the central unit a user sending status indicating whether
or not information to be sent to the central unit is to be
sent, wherein the third information and the fourth information are transmitted separately to the central unit;
and the central unit having a processor coupled to a memory,
the central unit capable of communicating with the first
mobile communications device over a first wireless communications link and with the second mobile communications device over a second wireless communications
link, the memory storing a first user profile including
information associated with a user of the first mobile
communications device and a second user profile
including information associated with a user of the second mobile communications device, wherein the central
unit receives the user sending status from the second
mobile communications device and when a current status of the sending status indicates information is to be
sent, receives the first and third information defining the
locations of the first and the second mobile communications devices and wherein the processor receives the first and the second user profiles to match information of the users and, if there is a match and depending upon the user sending status indicating information is to be sent, effects the transmission to the first mobile communications device of locating information based upon the first and third information defining the locations of the first and the second mobile communications devices, the locating information comprising routing information usable for the first user to arrive at a location of the second mobile communications device.

50. The system according to claim 49, wherein the first user profile includes a location, area, or volume and the match of information of the users includes a match of the location, area, or volume with the location of the second mobile communications device.

51. The system according to claim 49, wherein at least one of the first and the second mobile communications devices includes an input device for inputting the profile information.

52. The system according to claim 49, wherein the user profile information includes characteristics of the user and preferences of the user, and the match of information of the users includes matching preferences of the first user with characteristics of the second user and preferences of the second user with characteristics of the first user.

53. The system according to claim 52, wherein at least one characteristic of at least one user and at least one preference of at least one user are selected from the group consisting of a business relationship, a social relationship, a family relationship, physical characteristics, food, clothing, an activity, sports, entertainment, music, and video.

54. The system according to claim 49, wherein at least one of the first mobile communications device and the second mobile communications device comprises a cellular phone, a pager, a personal data assistant, a global positioning system receiver, a transponder, a radio, a walkie-talkie, or a wireless Internet access device.

55. The system according to claim 49, wherein the information defining the location of at least one of the first mobile communications device and the second mobile communications device includes an address, an intersection, a landmark, a marker, coordinates, or a telephone number.

56. The system according to claim 49, wherein the locating information includes audio information, video information, textual information, or graphical information.

57. The system according to claim 49, wherein the locating information is updated to track a movement of at least one of the first and the second mobile communications devices.

58. The system according to claim 49, wherein the central unit transmits additional information to at least one of the first and second mobile communications devices with the locating information.

59. The system according to claim 58, wherein the additional information is obtained over the Internet.

60. The system according to claim 49, wherein the user profile of at least one of the first mobile communications device and the second mobile communications device includes information identifying the user of the other mobile communications device.

61. The system according to claim 49, wherein the locating information is locating information for the second mobile communications device.

62. The system according to claim 49, wherein the locating information is locating information for a location other than the location of either the first mobile communications device or the second mobile communications device.

63. A system for matching a user of a mobile communications device desirous of a service with an operator of a service comprising:
a first mobile communications device for transmitting first information to a central unit defining a location of the first mobile communications device associated with a first user, for transmitting second information to the central unit defining first user profile information to, and for transmitting third information to the central unit defining a user receiving status, the first mobile communications device being a first cellular phone and the first user being an operator of a service, the user receiving status indicating whether or not the first mobile communications device is accepting information from the central unit including data from a second mobile communications device, the data reflecting a desire for service, wherein the first information, the second information, and the third information are transmitted separately to the central unit;
the second mobile communications device for transmitting fourth information to the central unit defining a location of the second mobile communications device associated with a second user, and for transmitting fifth information defining second user profile information to the central unit, the second mobile communications device being a second cellular phone and the second user being desirous of the service, wherein the fourth information and the fifth information are separately transmitted to the central unit; and
the central unit having a processor coupled to a memory, the central unit capable of communicating with the first mobile communications device over a first wireless communications link and with the second mobile communications device over a second wireless communications link, the first wireless communications link and the second wireless communications link enabling communication over the Internet, the memory storing a first user profile including the first user profile information associated with a user of the first mobile communications device and service type information indicating a type of service offered by the first user and a second user profile including the second user profile information associated with a user of the second mobile communications device and service preference information indicating the type of service preferred by the second user, wherein the central unit receives the third information comprising the user receiving status from the first mobile communications device and the first and fourth information defining the locations of the first and the second mobile communications devices and wherein the processor receives the first and the second user profiles to match information of the users, the match comprising determining that the service associated with the first user of the first mobile communications device is available and the user associated with the second communications device is desirous of the service, and, if there is a match and depending upon a current status of the user receiving status indicating information is being accepted, effects the transmission to the first mobile communications device of locating information derived from the first and fourth information defining the locations of the first and the second mobile communications devices, the locating information comprising routing information enabling the first user of the first mobile communications device to arrive at the location of the second user of the second mobile communications device.

64. The system of claim 63 wherein the service is a business service.

65. The system of claim 64 wherein the service is a hair dressing service and the service preference information includes a type of hair dresser.

66. The system of claim 64 wherein the service is a scheduling service for determining a meeting location.

67. The system of claim 64 wherein the service is a package shipping service.

68. The system of claim 64 wherein the service is a husbandry service and the service preference information includes criteria used to provide the most optimal mating for animals based on physical proximity to other animals of desirable mating characteristics.

69. The system of claim 64 wherein the service is a transportation service, the first user is an operator of a transportation vehicle and the second user is desirous of the transportation service.

70. The system of claim 69 wherein the first user profile information comprises information identifying the first user, contact information identifying a phone number of the first user, and service type information reflecting a type of service offered by the first user the second user profile information comprises information identifying the second user, information reflecting a physical characteristic of the second user, service preference information reflecting the type of service preferred by the second user, and contact information identifying a phone number of the second user.

71. The system of claim 69 wherein the locating information comprises a map indicating the location of the first user, wherein the map is updated to track a movement of the first user.

72. The system of claim 69 wherein the match comprises determining that the transportation vehicle associated with the first mobile communications device is available and the user associated with the second communications device is desirous of transportation.

73. The system according to claim 69, wherein the location of the second user of the second mobile communications device is a location other than the actual location of the second mobile communications device.

74. The system of claim 69 wherein the first mobile communications device is further configured to receive from the central unit third information notifying the first user that the first mobile communications device is within a boundary of a fixed location, wherein the first mobile communications device further comprises an input device for receiving input from the first user for at least one of determining whether the first mobile communications device is within a user-selected desired range of the fixed location and determining whether the first user wishes to meet the second user at the fixed location and wherein the locating information includes routing information enabling the first user of the first mobile communications device to arrive at the fixed location.

75. The system of claim 64 wherein the service is a companionship service and the service preference information includes criteria used to provide the most optimal match based the first profile information and the second profile information.

76. The system of claim 75, wherein the first profile information is comprised of first contact information, first physical characteristic information, first gender information, first social information, first age information reflecting the age of the first user and the second profile information is comprised of second contact information, second physical characteristic information, second gender information, second social information, second age information reflecting the age of the second user.

77. The system of claim 76, wherein the first profile information is further comprised of first religious information and the second profile information is further comprised of second religious information.

78. The system of claim 76, wherein the first profile information is further comprised of first economic information and the second profile information is further comprised of second economic information.

79. The system of claim 76, wherein the first profile information is received at the first mobile device based on input received at the first mobile device from the first user and the second profile information is received at the second mobile device based on input received at the second mobile device from the second user.

80. A system for matching a user of a mobile communications device desirous of a service with an operator of a service comprising:

a first mobile communications device for transmitting first information to a central unit defining a location of the first mobile communications device associated with a first user, for transmitting second information defining first user profile information, and for transmitting third information to the central unit defining a user receiving status, the first mobile communications device being a first cellular phone and the first user being an operator of a service, the user receiving status indicating whether or not the first mobile communications device is on and is currently available for accepting information including data from a second mobile communications device, the data reflecting a desire for service;

the second mobile communications device for transmitting fourth information to the central unit defining a location of the second mobile communications device associated with a second user and for transmitting fifth information defining second user profile information to the central unit, the second mobile communications device being a second cellular phone and the second user being desirous of the service, wherein the fourth information and the fifth information are transmitted separately to the central unit; and the central unit having a processor coupled to a memory, the central unit capable of communicating with the first mobile communications device over a first wireless communications link and with the second mobile communications device over a second wireless communications link, the first wireless communications link and the second wireless communications link enabling communication over the Internet, the memory storing a first user profile including the profile information associated with a user of the first mobile communications device and service type information indicating a type of service offered by the first user and a second user profile including the profile information associated with a user of the second mobile communications device and service preference information indicating the type of service preferred by the second user, wherein the central unit receives the user receiving status from the first mobile communications device and the first and fourth information defining the locations of the first and the second mobile communications devices and wherein the processor receives the first and the second user profiles to match information of the users, the match comprising determining that the service associated with the first user of the first mobile communications device is available and the user associated with the second communications device is desirous of the service, and, if there is a match and depending upon a current status of the user receiving status indicating the first mobile communications device is on and is currently available for accepting information, effects the transmission to the second mobile communications device of locating information derived from the first and fourth information defining the locations of the first and the second mobile communications devices, the locating information comprising routing information enabling the second user of the second mobile communications device to arrive at the location of the first user of the first mobile communications device.

81. The system of claim 80 wherein the service is a hair dressing service and the service preference information includes a type of hair dresser.

82. The system of claim 80 wherein the service is a scheduling service for determining a meeting location.

83. The system of claim 80 wherein the service is a package shipping service.

84. The system of claim 80 wherein the service is a husbandry service and the service preference information includes criteria used to provide the most optimal mating for animals based on physical proximity to other animals of desirable mating characteristics.

85. The system of claim 80 wherein the service is a transportation service, the first user is an operator of a transportation vehicle and the second user is desirous of the transportation service.

86. The system of claim 85 wherein the first user profile information comprises information identifying the first user, contact information identifying a phone number of the first user, and service type information reflecting a type of service offered by the first user the second user profile information comprises information identifying the second user, information reflecting the physical characteristic of the second user, service preference information reflecting the type of service preferred by the second user, and contact information identifying a phone number of the second user.

87. The system of claim 85 wherein the locating information comprises a map indicating the location of the first user, wherein the map is updated to track a movement of the first user.

88. The system of claim 85 wherein the match comprises determining that the transportation vehicle associated with the first mobile communications device is available and the user associated with the second communications device is desirous of transportation.

89. The system of claim 85, wherein the location of the second user of the second mobile communications device is a location other than the actual location of the second mobile communications device.

90. The system of claim 85 wherein the first mobile communications device is further configured to receive from the central unit third information notifying the first user that the first mobile communications device is within a boundary of a fixed location, wherein the first mobile communications device further comprises an input device for receiving input from the first user for at least one of determining whether the first mobile communications device is within a user-selected desired range of the fixed location and determining whether the first user wishes to meet the second user at the fixed location and wherein the locating information includes routing information enabling the first user of the first mobile communications device to arrive at the fixed location.

91. The system of claim 80 wherein the service is a companionship service and the service preference information includes criteria used to provide the most optimal match based the first profile information and the second profile information.

92. The system of claim 91, wherein the first profile information is comprised of first contact information, first physical characteristic information, first gender information, first social information, first age information reflecting the age of the first user and the second profile information is comprised of second contact information, second physical characteristic information, second gender information, second social information, second age information reflecting the age of the second user.

93. The system of claim 92, wherein the first profile information is further comprised of first religious information and the second profile information is further comprised of second religious information.

94. The system of claim 92, wherein the first profile information is further comprised of first economic information and the second profile information is further comprised of second economic information.

95. The system of claim 92, wherein the first profile information is received at the first mobile device based on input received at the first mobile device from the first user and the second profile information is received at the second mobile device based on input received at the second mobile device from the second user.

\* \* \* \* \*